(12) United States Patent
Mastrocola

(10) Patent No.: US 11,111,997 B2
(45) Date of Patent: Sep. 7, 2021

(54) MAGNETICALLY DRIVEN HARMONIC DRIVE

(71) Applicant: HAMILTON SUNDSTRAND CORPORATION, Charlotte, NC (US)

(72) Inventor: Naison E. Mastrocola, Goshen, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 588 days.

(21) Appl. No.: 15/961,430

(22) Filed: Apr. 24, 2018

(65) Prior Publication Data
US 2019/0323589 A1 Oct. 24, 2019

(51) Int. Cl.
*F16H 1/32* (2006.01)
*F16H 49/00* (2006.01)

(52) U.S. Cl.
CPC ......... *F16H 49/005* (2013.01); *F16H 49/001* (2013.01); *F16H 2049/003* (2013.01)

(58) Field of Classification Search
CPC .............................. F16H 49/001; H02K 7/116
USPC ........................................................... 74/640
See application file for complete search history.

(56) References Cited

U.S. PATENT DOCUMENTS

| 7,453,176 B2 * | 11/2008 | Davison ................ F16H 49/001 310/209 |
| 9,341,252 B2 * | 5/2016 | Zhang ................... F16H 55/084 |
| 2012/0204674 A1 * | 8/2012 | Lundberg .............. F16H 49/001 74/640 |
| 2015/0198222 A1 * | 7/2015 | Klassen ................. F16H 19/08 74/25 |

FOREIGN PATENT DOCUMENTS

| DE | 102006022543 A1 | 11/2007 |
| EP | 1772948 A1 | 4/2007 |
| JP | 6-62545 | * 3/1994 |
| JP | 2002-325418 | * 11/2002 |
| WO | 2010140656 A1 | 12/2010 |

OTHER PUBLICATIONS

Search Report dated Sep. 20, 2019 in U381072EP, EP application No. EP19169808, 9 pages.

* cited by examiner

*Primary Examiner* — William C Joyce
(74) *Attorney, Agent, or Firm* — Cantor Colburn LLP

(57) ABSTRACT

A compound harmonic actuator includes a circular gear, a flex gear including permanent magnets and a coil assembly disposed and configured to generate a magnetic field with which the permanent magnets interact to deform the flex gear. The coil assembly is controllable such that the deformation of the flex gear is such that the flex gear engages with the circular gear resulting in flex gear rotation.

13 Claims, 6 Drawing Sheets

MAGNETICALLY DRIVEN HARMONIC DRIVE

BACKGROUND

The following description relates to harmonic drives and, more specifically, magnetically driven harmonic drives.

A compound harmonic drive can reduce backlash in a motion-control system. A compound harmonic gear of a compound harmonic drive allows high gear reduction ratios with concentric shafts and relatively low backlash and vibration. The structure and operation of a harmonic gear are based upon a relatively simple construction using elasto-mechanical properties of metal.

The harmonic gear typically includes a wave generator, a flexible (flex) spline and a ring gear. The wave generator is an oval or elliptical cam with a thin bearing placed around an outer circumference thereof and is mounted onto a shaft of a motor. The flex spline is thin and made of elastic metal with external teeth formed along an outer circumference thereof (or with internal teeth formed along an inner circumference thereof in an inverted harmonic drive). The ring gear is a rigid internal gear with internal teeth formed along an inner circumference thereof the ring gear has a different number of internal teeth than the flex spline has external teeth. The ring gear is attached to a gearbox along an outer circumference thereof. The wave generator, the flex spline and the ring gear are co-axially aligned with respect to each other.

In operation, the wave generator is mounted on a drive shaft and rotatable such that it imparts a continuously moving elliptical form or wave-like motion to the flex spline. This causes a meshing of the external teeth of the flex spline with the internal teeth of the ring gear at respective equidistant points of engagement or connection thereof to progress in a continuously rolling fashion. It also allows for full-teeth axial disengagement or disconnection at the points opposite a minor axis of the wave generator. A major axis of the flex spline actually rotates with the wave generator, so the points where the corresponding teeth mesh with each other revolve around a center point at a rate equal to that of the wave generator.

Since the flex spline has fewer external teeth than the ring gear has internal teeth and the full-teeth axial disconnect is made possible by the ellipticity of the wave generator, each complete revolution of the wave generator causes a circumferential displacement of the flex spline in relation to the ring gear. This displacement is always in a direction opposite to that of the rotation of the wave generator. That is, if the wave generator is rotating in a clockwise direction, the displacement of the flex spline is in a counter-clockwise direction and vice versa. In this way, the compound harmonic drive is capable of functioning as a speed reducer.

In an aircraft system, for example, a rotary electromechanical actuator (rotary EMA) is implemented mainly for ailerons, flaps, slats and spoiler and other flight-control surfaces. In this context, the compound harmonic drive is incorporated with the rotary EMA.

BRIEF DESCRIPTION

According to an aspect of the disclosure, a compound harmonic actuator is provided. The compound harmonic actuator includes a circular gear, a flex gear including permanent magnets and a coil assembly disposed and configured to generate a magnetic field with which the permanent magnets interact to deform the flex gear. The coil assembly is controllable such that the deformation of the flex gear is such that the flex gear engages with the circular gear resulting in flex gear rotation.

In accordance with additional or alternative embodiments, the flex gear includes a polymeric or metallic material in which the permanent magnets are suspended.

In accordance with additional or alternative embodiments, the flex gear is deformable in two or more directions.

In accordance with additional or alternative embodiments, the flex gear surrounds the circular gear, first teeth are on an exterior of the circular gear and second teeth are on an interior of the flex gear.

In accordance with additional or alternative embodiments, the coil assembly includes an annular array of stator elements and wiring wound on the stator elements.

In accordance with additional or alternative embodiments, the coil assembly is disposed within the circular gear, at an exterior of the flex gear or within the circular gear and at the exterior of the flex gear.

In accordance with additional or alternative embodiments, a controller is coupled to the wiring and configured to control operations of the coil assembly.

In accordance with additional or alternative embodiments, the compound harmonic actuator further includes a housing, the circular gear is fixed relative to the housing and the flex gear is rotatable relative to the housing.

In accordance with additional or alternative embodiments, the compound harmonic actuator further includes a secondary circular gear and flex gear deformation is such that the flex gear engages with the secondary circular gear resulting in secondary circular gear rotation.

According to another aspect of the disclosure, a compound harmonic actuator is provided and includes a circular gear, a flex gear including permanent magnets arranged along a circumferential length thereof, a coil assembly disposed and configured to generate a magnetic field with which the permanent magnets interact to deform the flex gear and a controller. The controller is coupled to the coil assembly and configured to control the coil assembly such that the deformation of the flex gear is patterned to cause engagement of the flex gear and the circular gear resulting in flex gear rotation.

In accordance with additional or alternative embodiments, the flex gear is disengaged from the circular gear when the controller controls the coil assembly to assume a nil field state.

In accordance with additional or alternative embodiments, wherein the controller controls the coil assembly such that the flex gear deforms in two or more directions.

According to yet another aspect of the disclosure, a compound harmonic actuator is provided and includes a housing, an output arm, a circular gear including a first number of first teeth, which is fixed relative to the housing, a flex gear including a second number of second teeth and permanent magnets arranged along a circumferential length thereof, the flex gear being rotatable relative to the housing and coupled to the output arm and a coil assembly. The coil assembly is disposed and configured to generate a magnetic field with which the permanent magnets interact to deform the flex gear such that the second teeth engage with the first teeth. The first and second numbers are different and the coil assembly is controllable such that the deformation of the flex gear is such that engagement of the second teeth with the first teeth results in flex gear and output arm rotation.

In accordance with additional or alternative embodiments, the flex gear includes a polymeric or metallic material in which the permanent magnets are suspended.

In accordance with additional or alternative embodiments, the flex gear is deformable in two or more directions.

In accordance with additional or alternative embodiments, the flex gear surrounds the circular gear, the first teeth are on an exterior of the circular gear and the second teeth are on an interior of the flex gear.

In accordance with additional or alternative embodiments, the coil assembly includes an annular array of stator elements and wiring wound on the stator elements.

In accordance with additional or alternative embodiments, the compound harmonic actuator further includes a controller coupled to the wiring and configured to control operations of the coil assembly.

In accordance with additional or alternative embodiments, the coil assembly is disposed within the circular gear, at an exterior of the flex gear or within the circular gear and at the exterior of the flex gear.

In accordance with additional or alternative embodiments, the compound harmonic actuator further includes a secondary circular gear including a third number of third teeth, the flex gear includes a fourth number of fourth teeth, the third and fourth numbers are different and the deformation of the flex gear is such that the third and fourth teeth engage to drive rotation of the secondary circular gear.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

Traditional harmonic gear trains have limited service lives due to the need for bearings. These bearings ride on the strain wave generator to create the elliptical shape needed for harmonic wave generation but contribute a failure mode that increases an overall failure rate. Thus, as will be described below, a harmonic gear train is provided in an inverted or non-inverted configuration with permanent magnets included in the elliptical flex gear and a magnetic drive including multi-phase electric coils. The coils can be energized in sequence to deform and thereby advance the elliptical flex gear. This can be done without bearings or wear points while maintaining same performance characteristics as traditional wave generators.

Figure 1:
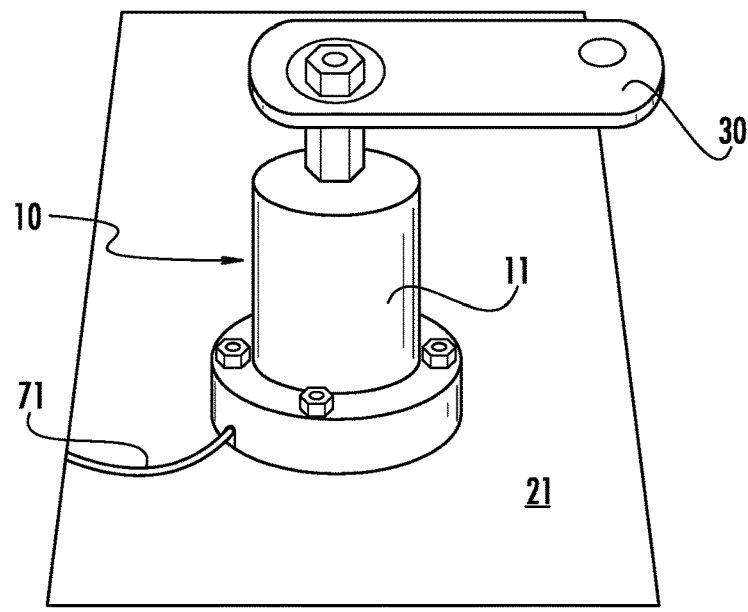
FIG. 1 is a perspective view of a compound harmonic actuator in accordance with embodiments.
Figure 2:
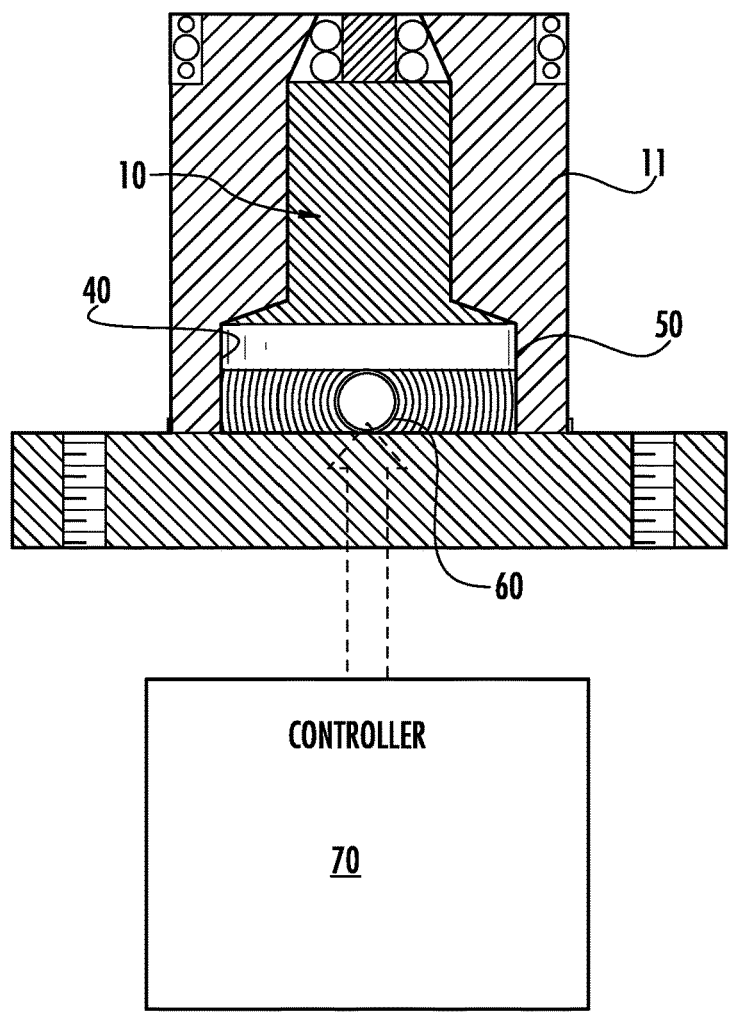
FIG. 2 is a side cutaway view of the compound harmonic actuator of FIG. 1 and a controller.
Figure 3:
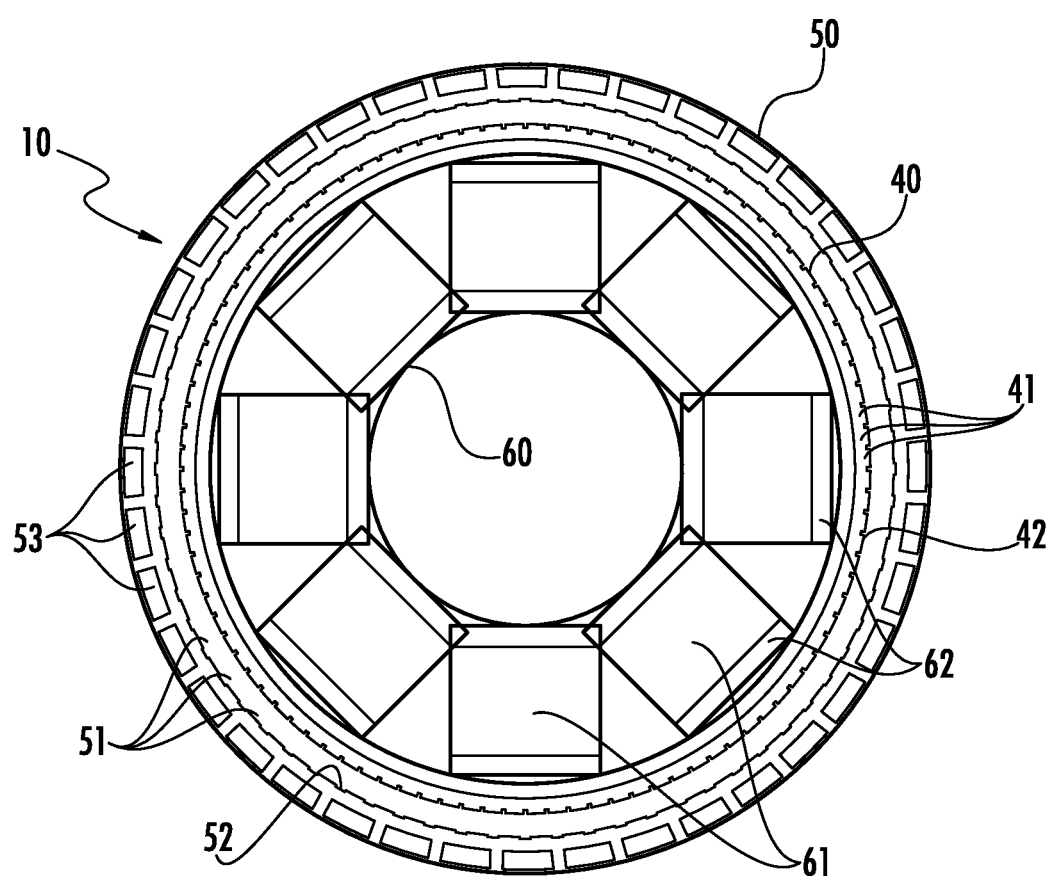
FIG. 3 is an axial view of a compound harmonic actuator in a nil field state in accordance with embodiments.
Figure 4:
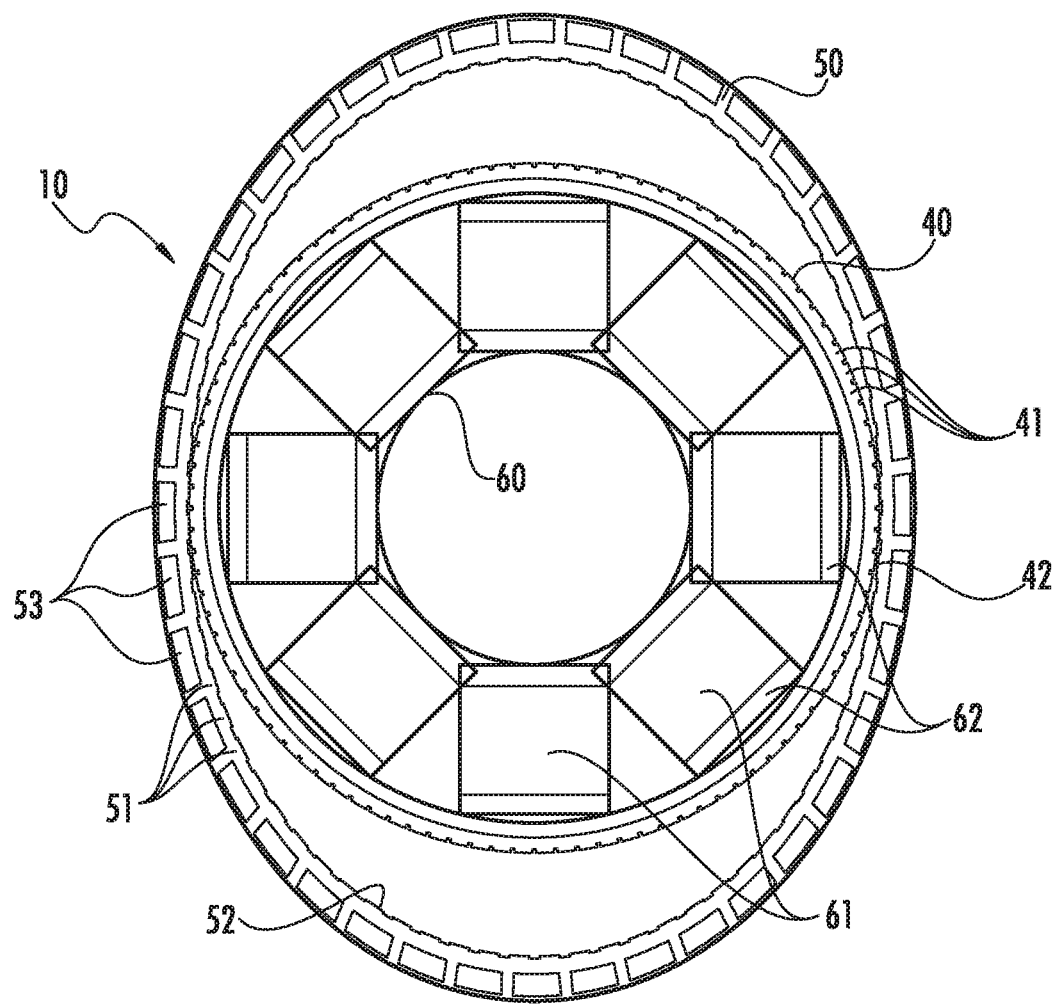
FIG. 4 is an axial view of the compound harmonic actuator of FIG. 3 in a first field state.
Figure 5:
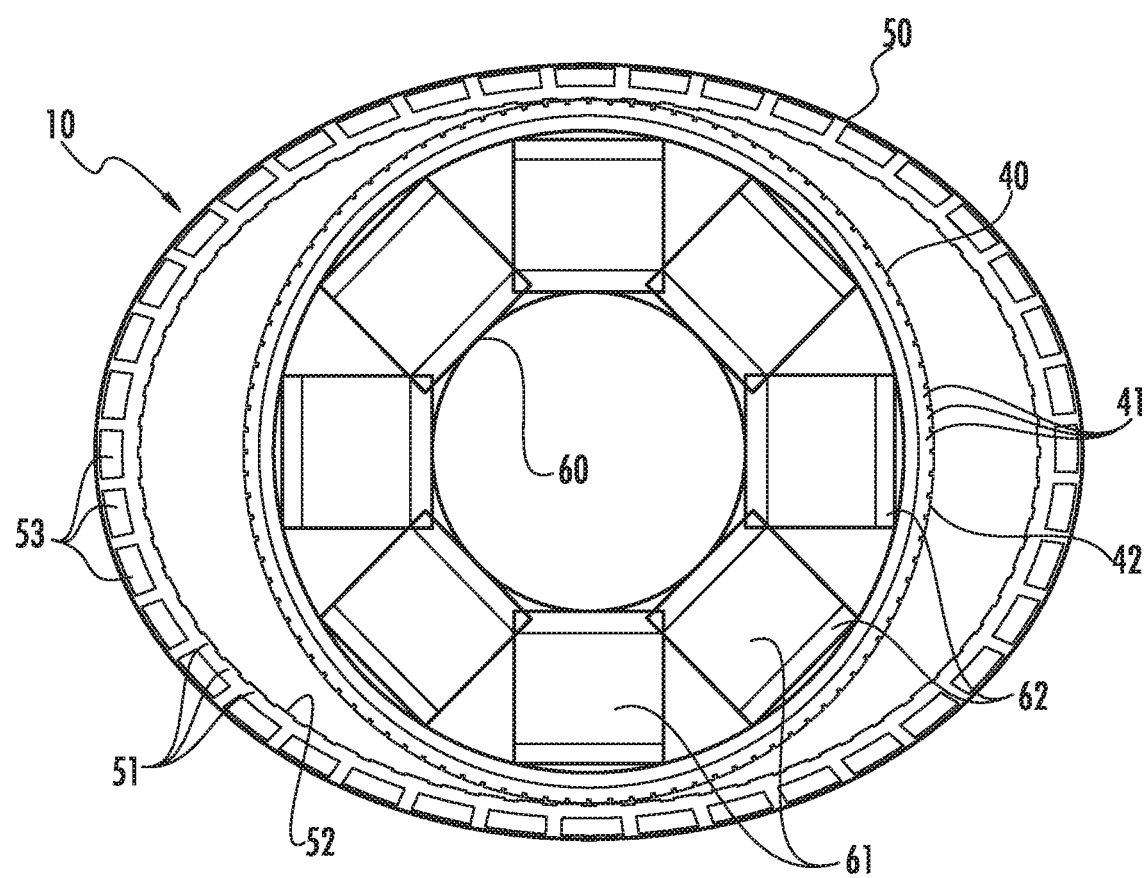
FIG. 5 is an axial view of the compound harmonic actuator of FIG. 3 in a second field state.

With reference to FIGS. 1 and 2 as well as FIGS. 3-5, a compound harmonic actuator 10 is provided and includes a housing 20, which may be affixed to a surface 21, an output arm 30, which is pivotable relative to the housing 20 and the surface 21, a circular gear 40, a flex gear 50 surrounding the circular gear 40 and a coil assembly 60.

The circular gear 40 may be formed of various materials that do not interfere with or absorb magnetic fields and includes a first number of first teeth 41 on an exterior surface 42 thereof. The circular gear 40 may be rotationally fixed relative to the housing 20 and the surface 21. The flex gear 50 may be formed of a polymeric or metallic material and is deformable in two or more directions. The flex gear 50 includes a second number of second teeth 51 on an interior surface 52 thereof. The flex gear 50 further includes permanent magnets 53 that are suspended within the polymeric or metallic material and which are arranged along a circumferential length of the flex gear 50. The flex gear 50 may be rotatable relative to the housing 20 and coupled to the output arm 30. The coil assembly 60 is disposed and configured to generate a magnetic field with which the permanent magnets 53 interact to deform the flex gear 50 such that the second teeth 51 engage with the first teeth 41.

As shown in FIGS. 1 and 2, the housing 20 may be provided with a conical or frusto-conical shape in which the end of the housing 20 proximate to the coil assembly 60 and the circular gear 40 is relatively wide and the opposite end of the hosing is relatively narrow.

As shown in FIGS. 3-5, the coil assembly 60 includes an annular array of stator elements 61 that are fixed relative to the housing 20 and the surface 21 and wiring 62. The wiring 62 is wound around each of the stator elements 61 and can be set in a nil state, in which the wiring 62 carries little to no current, and at least first and second field states in which the wiring 62 of some of the stator elements 61 but not all of the stator elements 62 carries current.

In accordance with embodiments, when the wiring 62 is set in the nil state (see FIG. 3), the coil assembly 60 as a whole does not generate a magnetic field of any significance and the flex gear 60 assumes a normal, un-deformed condition in which the second teeth 51 do not engage with the first teeth 41. By contrast, when the wiring 62 is set in a first field state (see FIG. 4), some of the stator elements 61 of the coil assembly 60 generate magnetic fields in orthogonal directions and the flex gear 60 assumes a first deformed condition in which corresponding sections of the second teeth 51 engage with corresponding sections of the first teeth 41 Similarly, when the wiring 62 is set in a second field state (see FIG. 5), others of the stator elements 61 of the coil assembly 60 generate magnetic fields in orthogonal directions and the flex gear 60 assumes a second deformed condition in which corresponding sections of the second teeth 51 engage with corresponding sections of the first teeth 41.

In accordance with embodiments, the first and second numbers of the first teeth 41 and the second teeth 51, respectively, are different from one another. Thus, with the coil assembly 60 being controllable by a controller 70 (see FIG. 2), for example, deformation of the flex gear 50 as the coil assembly 60 is set in the first and second field states occurs in a manner such that engagement of the second teeth 51 with the first teeth 41 results in rotation of the flex gear 50 about a rotational axis of the flex gear 50. This rotation results, in turn, in rotation or pivoting of the output arm 30 relative to the housing 20 and the surface 21.

As shown in FIG. 2, the controller 70 is operably coupled with the wiring 62 by way of control wiring 71 (see FIG. 1) and is thereby configured to control operations of the coil assembly 60 as a whole. To this end, the controller 70 may include a processing unit, a memory unit and a sensing unit, which is disposed and configured to sense a rotational position of the flex gear 50. The memory unit has executable instructions stored thereon, which are readable and executable by the processing unit. When the executable instructions are read and executed by the processing unit, the executable instructions cause the processing unit to recognize a rotational position of the flex gear 50 from readings of the sensing unit, to determine what field state for the coil assembly 60 is required based on the rotational position and to calculate or generate an energization command for energizing the wiring 62 based on the determination.

Figure 6:
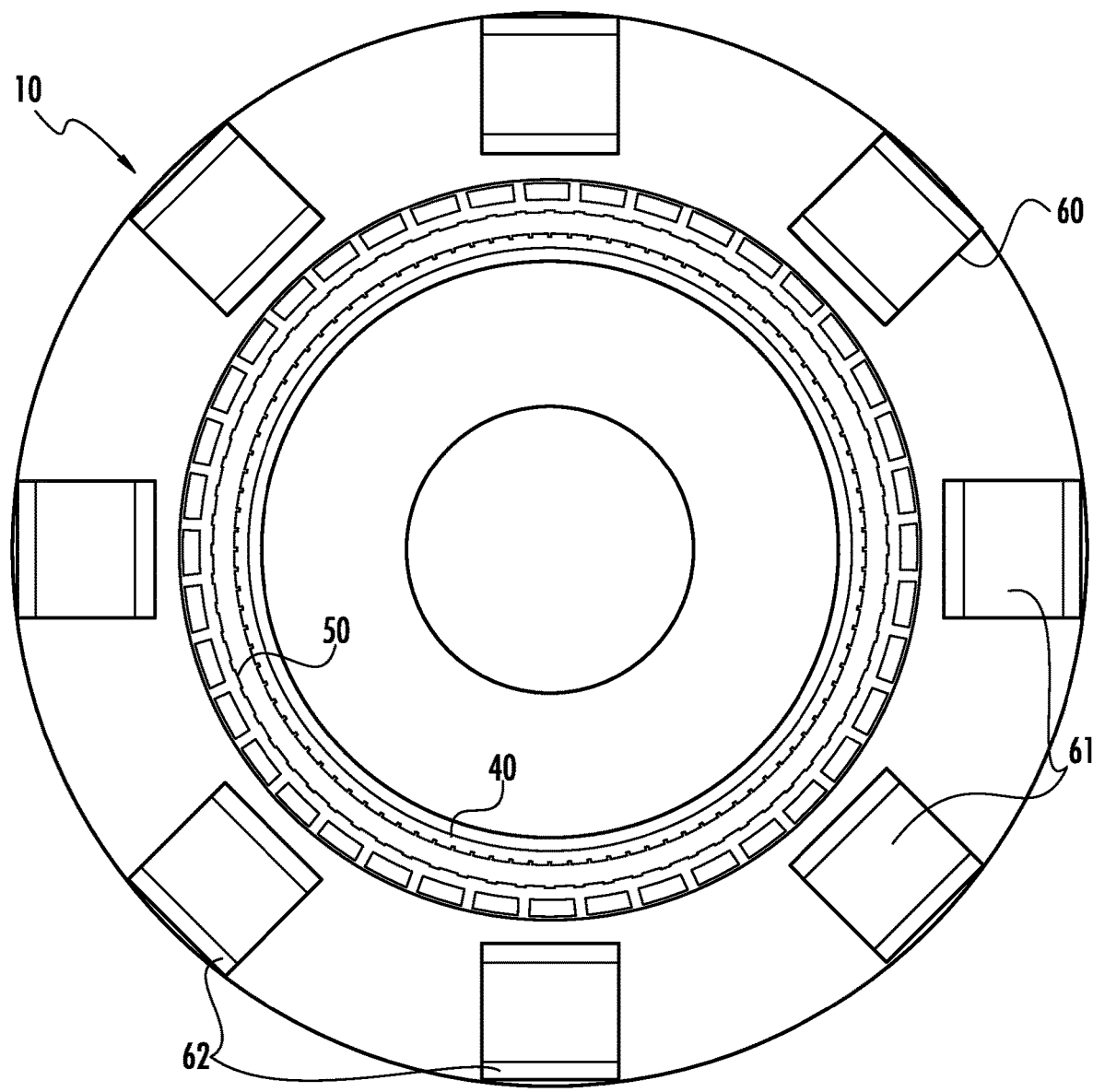
FIG. 6 is an axial view of a compound harmonic actuator in accordance with further embodiments.

In accordance with embodiments, the coil assembly 60 may be disposed within the circular gear 40 as shown in FIGS. 3-5. In accordance with alternative or additional embodiments, however, the coil assembly 60 may also be disposed at an exterior of the flex gear 50 as shown in FIG. 6. In accordance with still further embodiments, the coil assembly 60 may be disposed within the circular gear 40 and at the exterior of the flex gear 50 as a combination of the details of FIGS. 3-5 and 6.

Figure 7:
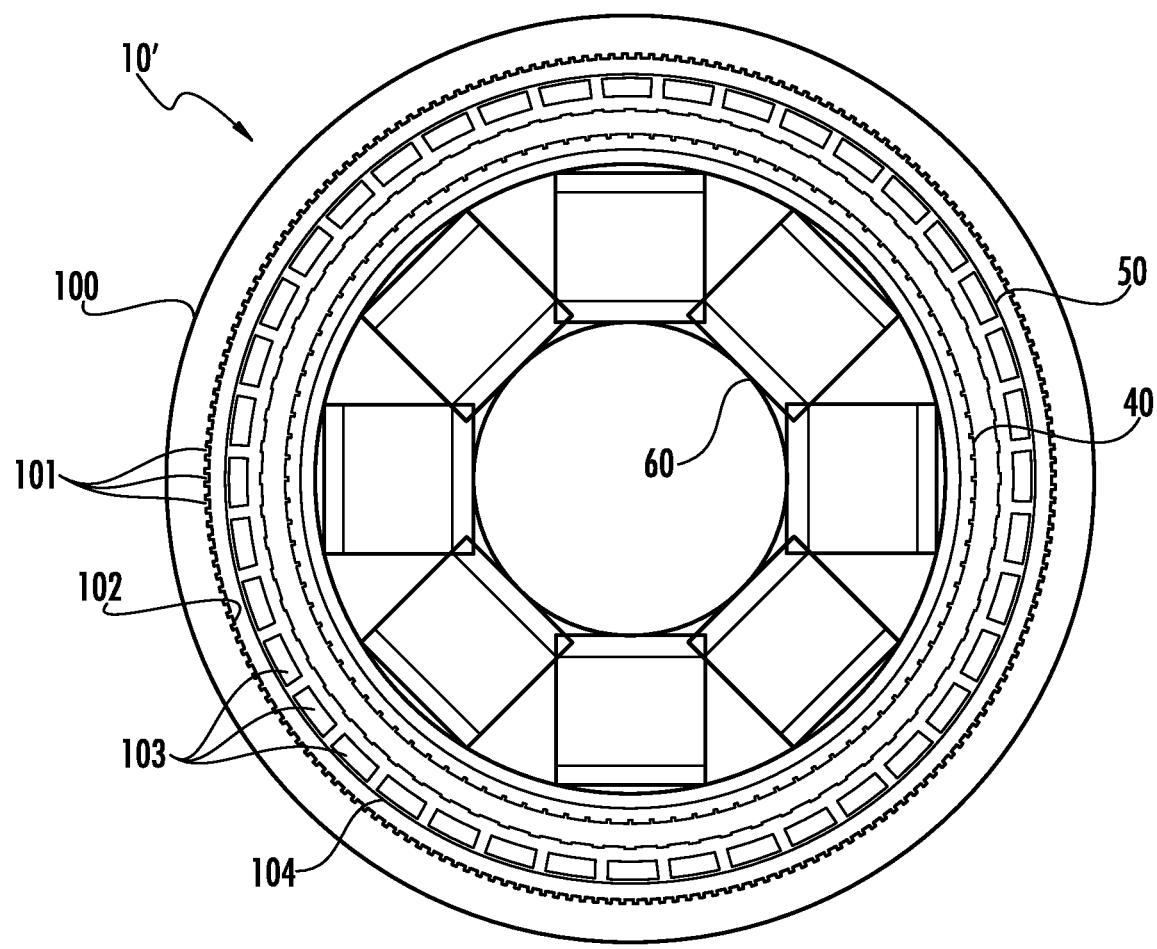
FIG. 7 is an axial view of a compound harmonic actuator in accordance with further embodiments.

With reference to FIG. 7 and, in accordance with still further embodiments, the compound harmonic actuator 10 may be provided as a two-stage compound harmonic actuator 10'. Here, the two-stage compound harmonic actuator 10' includes the features described above as well as a secondary circular gear 100 that in turn includes a third number of third teeth 101 on an interior surface 102 thereof. In addition, the flex gear 50 may include a fourth number of fourth teeth 103 on an exterior surface 104 thereof, the third and fourth numbers of the third teeth 101 and the fourth teeth 103, respectively, may be different and the deformation of the flex gear 50 described above may be provided in an manner whereby the fourth teeth 103 engage with the third teeth 101 engage to drive rotation of the secondary circular gear 100 about the rotational axis.

Benefits of the features described herein are the provision of a compound harmonic actuator that is electro-magnetically driven without an intervening gear train that is therefore more efficient than conventional actuators. In addition, since the compound harmonic actuator is electro-magnetically driven, bearings supporting an input arm are not required and thus a reliability of the compound harmonic actuator is improved.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:
1. A compound harmonic actuator, comprising:
a circular gear;
a flex gear including permanent magnets, wherein respective entireties of the permanent magnets are suspended within the flex gear; and
a coil assembly disposed and configured to generate a magnetic field with which the permanent magnets interact to deform the flex gear,
the coil assembly being controllable such that the deformation of the flex gear is such that the flex gear engages with the circular gear resulting in flex gear rotation,
the compound harmonic actuator further comprising a secondary circular gear, wherein:
the flex gear surrounds the circular gear and the secondary circular gear surrounds the flex gear,
first teeth are on an exterior of the circular gear and second teeth are on an interior of the flex gear such that the first and second teeth are engageable,
third teeth are on an interior of the secondary circular gear and fourth teeth are on an exterior of the flex gear such that the third and fourth teeth are engageable, and
flex gear deformation is such that the flex gear engages with the secondary circular gear resulting in secondary circular gear rotation.

2. The compound harmonic actuator according to claim 1, wherein the flex gear comprises a polymeric or metallic material in which the respective entireties of the permanent magnets are suspended.

3. The compound harmonic actuator according to claim 1, wherein the flex gear is deformable in two or more directions.

4. The compound harmonic actuator according to claim 1, wherein the coil assembly comprises an annular array of stator elements and wiring wound on the stator elements.

5. The compound harmonic actuator according to claim 1, wherein the coil assembly is disposed within the circular gear and at the exterior of the flex gear.

6. The compound harmonic actuator according to claim 5, further comprising a controller coupled to the wiring and configured to control operations of the coil assembly.

7. The compound harmonic actuator according to claim 1, further comprising a housing, wherein:
the circular gear is fixed relative to the housing, and
the flex gear is rotatable relative to the housing.

8. A compound harmonic actuator, comprising:
a housing;
an output arm;
a circular gear including a first number of first teeth, which is fixed relative to the housing;
a flex gear including a second number of second teeth and permanent magnets arranged along a circumferential length thereof, the flex gear being rotatable relative to the housing and coupled to the output arm and respective entireties of the permanent magnets are suspended within the flex gear; and
a coil assembly disposed and configured to generate a magnetic field with which the permanent magnets interact to deform the flex gear such that the second teeth engage with the first teeth,
the first and second numbers being different and the coil assembly being controllable such that the deformation of the flex gear is such that engagement of the second teeth with the first teeth results in flex gear and output arm rotation,
the compound harmonic actuator further comprising a secondary circular gear comprising a third number of third teeth, wherein:
the flex gear comprises a fourth number of fourth teeth and the third and fourth numbers are different, the flex gear surrounds the circular gear and the secondary circular gear surrounds the flex gear, the first teeth are on an exterior of the circular gear and the second teeth are on an interior of the flex gear, the fourth teeth are on an exterior of the flex gear and the third teeth are on an interior of the secondary circular gear, and the deformation of the flex gear is such that the third and fourth teeth engage to drive rotation of the secondary circular gear.

9. The compound harmonic actuator according to claim 8, wherein the flex gear comprises a polymeric or metallic material in which the respective entireties of the permanent magnets are suspended.

10. The compound harmonic actuator according to claim 8, wherein the flex gear is deformable in two or more directions.

11. The compound harmonic actuator according to claim 8, wherein the coil assembly comprises an annular array of stator elements and wiring wound on the stator elements.

12. The compound harmonic actuator according to claim 11, further comprising a controller coupled to the wiring and configured to control operations of the coil assembly.

13. The compound harmonic actuator according to claim 8, wherein the coil assembly is disposed within the circular gear and at the exterior of the flex gear.

* * * * *